Feb. 5, 1963

M. L. BENJAMIN ETAL 3,076,661

EXPANSIBLE MANDREL

Filed Sept. 28, 1961

INVENTORS
MILTON L. BENJAMIN &
FRANKLYN E. WINNEN
BY
Oberlin, Maky & Donnelly
ATTORNEYS Feb. 5, 1963 M. L. BENJAMIN ETAL 3,076,661
EXPANSIBLE MANDREL
Filed Sept. 28, 1961 2 Sheets-Sheet 2

INVENTORS
MILTON L. BENJAMIN &
BY FRANKLYN E. WINNEN
Oberlin, Maky & Donnelly
ATTORNEYS ated Feb. 5, 1963

**3,076,661
EXPANSIBLE MANDREL**
Milton L. Benjamin, Shaker Heights, and Franklyn E. Winnen, Cleveland, Ohio, assignors to Erickson Tool Company, Solon, Ohio, a corporation of Ohio
Filed Sept. 28, 1961, Ser. No. 141,366
17 Claims. (Cl. 279—2)

This invention relates to workpiece holders and, more particularly, to an expansible mandrel for internally gripping tubular workpieces and the like.

In the finishing and deburring of cylindrical parts such as housings for electric motors, it is desirable to place the part over an expansible mandrel which will firmly grip the interior of the part while the finishing or deburring operation is conducted. It is desirable that the interior contact of the mandrel with the part be a cylindrical area contact rather than a plurality of point contacts so that the part is not deformed during the finishing operation. Although such expansible mandrels are known, existing devices have certain disadvantages which tend to impede high speed production operations. For example, they are generally unsuited to quick adjustment to accommodate different size parts and require as long as 15 to 20 minutes for a changeover from one diameter or length frame to another. Further, they require a wide variety of spacers and other accessories to effect such changes.

It is, therefore, an object of this invention to provide an expansible mandrel having a plurality of mandrel assemblies thereon capable of simple and rapid axial adjustment.

Another object is to provide such a mandrel wherein the gripping contact is effected by an expanding collet ring.

A further object is to provide such a mandrel wherein the number and size of the various mandrel assemblies thereon can be varied quickly and easily.

Yet another object of the invention is to provide such a mandrel which applies a relatively uniform gripping pressure both longitudinally and around the internal circumference of the gripped surface of the workpiece.

Still another object is to provide such a mandrel wherein the gripping pressure is easily controlled.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
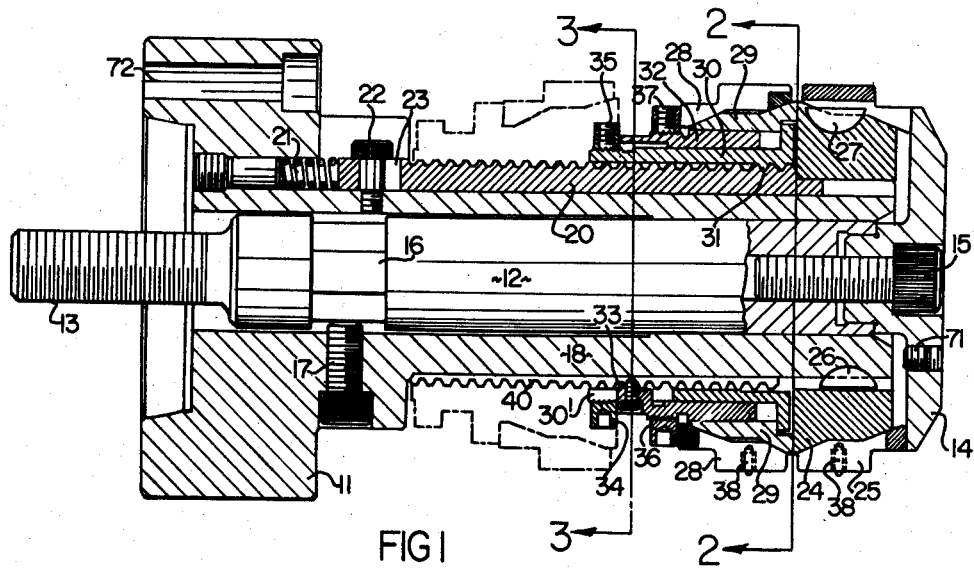
FIG. 1 is a longitudinal cross-section view of an expansible mandrel taken along line 1—1 of FIG. 3.
Figure 3:
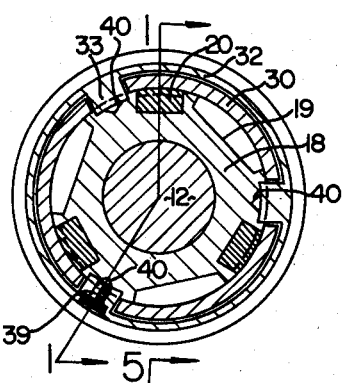
FIG. 3 is a transverse sectional view taken along line 3—3 of FIG. 1.
Figure 2:
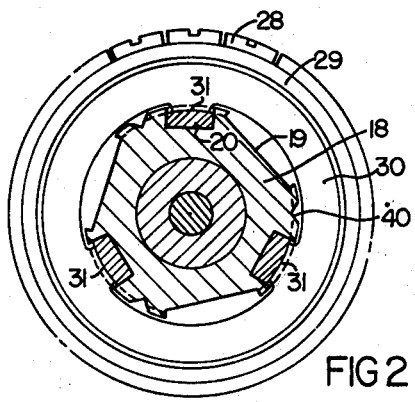
FIG. 2 is a transverse sectional view taken along line 2—2 of FIG. 1.
Figure 9:
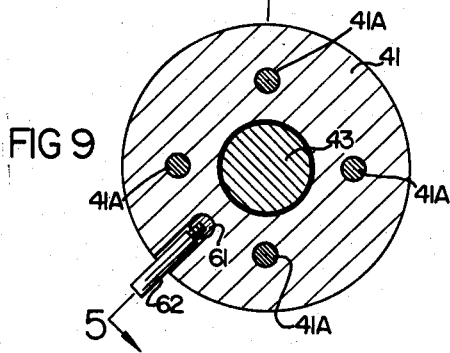
FIG. 9 is a transverse sectional view taken along line 9—9 of FIG. 5.
Figure 4:
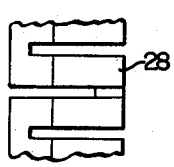
FIG. 4 is a fragmentary elevation view of the left collet ring of FIG. 1.

Referring now to the drawings and in particular to FIGS. 1 through 4, a mandrel holder 11 is provided having a cylindrical bore therein in which shaft 12 is mounted for reciprocable motion. One end 13 of the shaft is threaded for engagement with a draw bar or the like (not shown) capable of drawing the shaft 12 to the left as viewed in the drawing. Attached to the other end of the shaft 12 is an enlarged head portion 14 which may be easily detached upon removal of the bolt 15. The shaft 12 is also provided with an octagonal neck 16 engaged by screw 17, the latter being threadably engaged through the holder 11 so that its flat end abuts one of the octagonal faces of the neck 16. In this manner the screw 17 serves not only to limit the axial movement of the shaft 12 but also to prevent any rotational movement thereof. The elongated generally cylindrical portion 18 of the holder 11 has on its surface three axial threadless lands or grooves 19 as can be seen in FIGS. 2 and 3. The cylindrical portion 18 also has in its surface three axial keys 20 which are mounted within corresponding grooves in the surface and are adapted for axial sliding movement therein. The remainder of the surface of the cylindrical portion 18 has circumferential threads thereon and the surface of the keys 20 are also provided with threads registrable with the threads of the cylindrical portion 18.

Each of the keys 20 is biased by an axial spring 21 and a cap screw 22 is placed through a slot 23 in the key in threadable engagement with the holder 11 to thereby hold the key in the groove of the holder portion 18 and also limit its axial movement. When the key 20 is in the position shown in FIG. 1, the threads thereof will register with the threads of the cylindrical portion 18.

A first mandrel assembly comprising an inner ring 24 and outer collet ring 25 (alternately slotted through its opposite ends) are located on the end of the cylindrical portion 18 adjacent the head 14. The rings 24 and 25 have opposed mated frusto-conical surfaces as shown whereby when the rings are forced together, the outer collet ring 25 is expanded. As shown in FIG. 1, the outer collet ring 25 is adapted to be engaged by the head 14 which will force the rings together as the shaft 12 is drawn to the left. The inner ring 24 is axially slidably keyed on the end of the cylindrical portion 18 by key 26. The ends of keys 20 have shoulders in abutting contact with inner ring 24 so that axial movement of the latter causes axial movement of the keys 20 relative to the cylindrical portion 18. The inner ring 24 has another key 27 engaged with the outer collet ring 25 to prevent relative rotational movement between these rings.

A second mandrel assembly is provided on the mandrel holder inwardly from the first mandrel assembly. This second mandrel assembly is shown in FIG. 1 to be closely adjacent the above-described first mandrel assembly; however, the phantom lines of FIG. 1 show an alternative position of the second mandrel assembly axially spaced from the first. The second mandrel assembly comprises an outer expansible collet ring 28 and an inner ring 29, each having opposed mated frusto-conical surfaces as previously described in connection with rings 24 and 25. A first sleeve 30 is provided having a flange portion engaged within a recess in inner ring 29. The interior surface of sleeve 30 is provided with three internally threaded portions 31 which are circumferentially registrable with the keys 20 and engageable with the threads tnereon. Thus, it can be seen that when the threaded portions 31 are engaged with the keys 20, axial movement of the keys will cause axial movement of the sleeve 30 which is transmitted to the inner ring 29 through the flange on sleeve 30. A second sleeve 32 is provided which fits concentrically around first sleeve 30 and which has three inwardly projecting internally threaded portions 33 which are registrable with the threaded surfaces of the cylindrical portion 18. First sleeve 30 has three equally spaced notches or slots 30' in one end thereof which when interengaged with second sleeve 32 receive the internally threaded portions 33 of the latter therein; such interengagement serving to lock the two sleeves 30 and 32 together for unified rotational movement but permitting relative axial movement of the sleeves restricted only by lock nut 34 which is threadably engaged to the exterior of sleeve 30 abutting the extreme end of sleeve 32. The lock nut 34 is provided with a set screw 35 to secure its position. A preload nut 36 is threadably engaged to the exterior of second sleeve 32 and abuts one end of outer collet ring 28 to prevent axial movement of the latter. The preload nut 36 is also provided with a securing set screw 37.

When a tubular workpiece is placed over the expanding mandrel shown in FIG. 1, the interior surface thereof contacts the outer collet rings 25 and 28. A spring-loaded ball plunger 38 is located in the surface of each of the latter rings to frictionally engage the interior surface of the workpiece before gripping to position the axis of the workpiece parallel to the axis of shaft 12 and of expansible rings 25 and 28. When shaft 12 is drawn to the left, the head 14 moves outer collet ring 25 over the wedging surface of inner ring 24 causing an expansion of the collet ring 25 against the interior of the workpiece. Before the wedging action takes place, however, the inner ring 24 is moved axially to the left causing a consequent leftward movement of the keys 20 whereby first sleeve 30 will be moved leftward and its flange portion engaging inner ring 29 will cause leftward movement of the latter. Second sleeve 32 is precluded from axial movement by its threaded engagement with the cylindrical portion 18 of the mandrel holder 11 and through its preload nut 36 prevents axial movement of outer collet ring 28. The wedging movement, therefore, of inner ring 29 causes expansion of outer collet ring 28 with a consequent substantially simultaneous gripping of the interior of the workpiece by both collet rings 25 and 28.

When a different length workpiece is to be mounted on the expanding mandrel shown in FIG. 1, the entire second mandrel assembly may be axially adjusted by rotating sleeves 30 and 32 until their respective internally threaded portions 31 and 33 are over lands 19. In this position the assembly is entirely out of engagement with the mandrel holder. When the correct distance is selected, the sleeves are then engaged with the keys 20 and the mandrel holder 11 as described above. A pointed screw 39 is provided in one of the internally threaded portions 33 of sleeve 32 to engage a selected longitudinal groove 40 in the surface of the cylindrical portion 18. When this screw 39 is in position, the second mandrel assembly is locked in predetermined axial position on holder portion 18 to accommodate a different length workpiece.

When it is desired to replace the mandrel assemblies on the expanding mandrel shown in FIG. 1, it is only necessary that screw 15 be removed to permit dismounting of the head 14 from the shaft 12. Rings 24 and 25 may be pulled off the mandrel holder directly and the entire second mandrel assembly may be removed by backing off screw 39 and rotation of the assembly in the same manner described above for axial adjustment thereof.

Referring now to the expanding mandrel illustrated in FIGS. 5 through 9 of the drawings, a similar mandrel holder 41 having a cylindrical portion 42 is provided with a shaft 43 therethrough. The shaft head 44 has an outside diameter smaller than that of the cylindrical portion 42. The shaft has an octagonal neck portion 45 engaged by a screw (not shown) to prevent rotation and limit axial movement in the same manner as described with reference to screw 17 of FIG. 1. The cylindrical portion 42 has four equally spaced axial threadless lands 46 and two pairs of keys 47A and 47B similar to keys 20 of FIG. 1 axially slidable in corresponding grooves of portion 42. All the keys are spring-biased toward the right in FIG. 5, rods 41A being biased by springs similar to springs 21 employed in FIG. 1. One pair of keys 47A extend beyond the end of cylindrical portion 42 and are engaged by the head 44.

Figure 7:
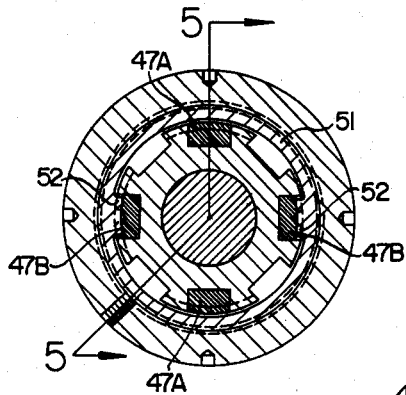
FIG. 7 is a transverse sectional view taken along line 7—7 of FIG. 5.
Figure 6:
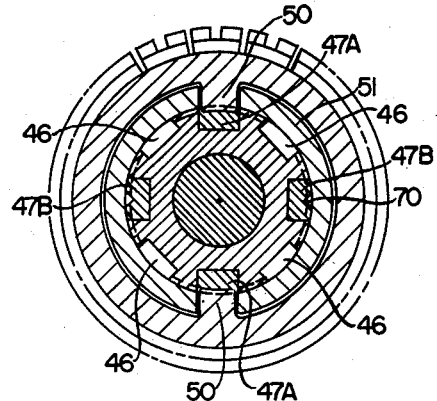
FIG. 6 is a transverse sectional view taken along line 6—6 of FIG. 5.

On the holder 41 is mounted a first mandrel assembly comprising outer expansible collet ring 48 and inner ring 49. Rings 48 and 49 also have opposed mated frusto-conical surfaces and outer collet ring 48 is similar to collet ring 28 of FIG. 4 and is adapted to be expanded by axial wedging movement of inner ring 49. Inner ring 49 has a pair of threaded inwardly protruding portions 50 which are registrable with keys 47A as shown in FIG. 6. A sleeve 51 is provided which fits concentrically within inner ring 49 having slots 51' in one end thereof which accommodate portions 50 for interengagement of the inner ring 49 and the sleeve 51 permitting unitary rotational movement of the latter two members as well as relative axial movement therebetween. Sleeve 51 is also provided with internally threaded portions 52 registrable with keys 47B as shown in FIG. 7. The exterior ends of sleeve 51 are also threadably engaged by preloading nuts 53 and 54 which position rings 48 and 49 and prevent disengagement tnereof.

Figure 5:
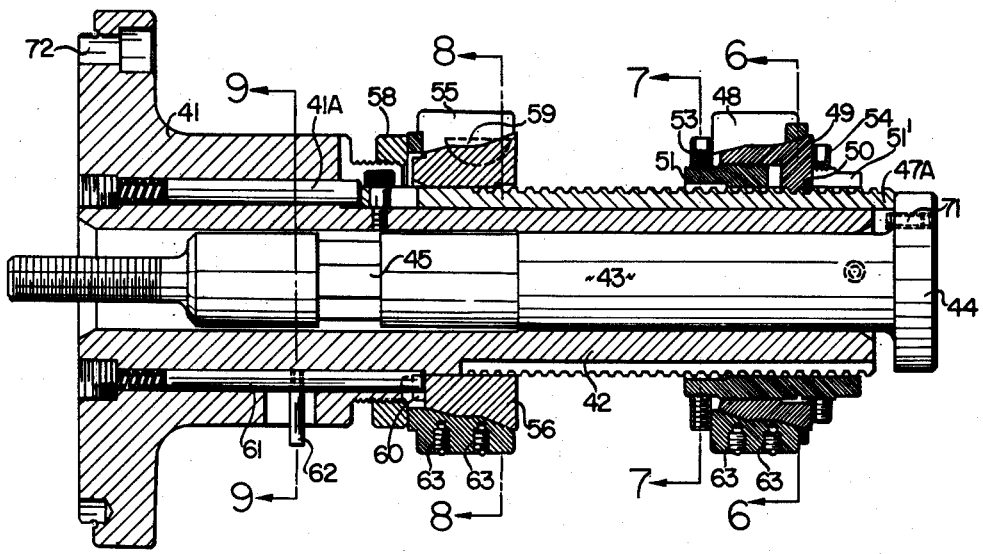
FIG. 5 is a longitudinal cross-section view of another expansible mandrel according to this invention taken along line 5—5 of FIG. 7.
Figure 8:
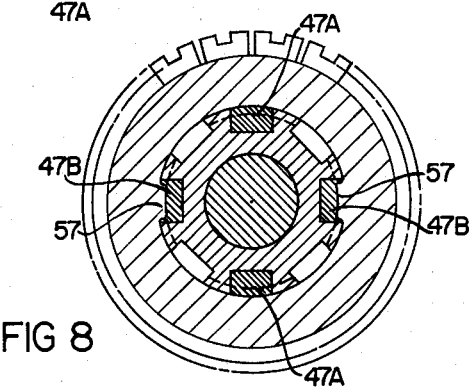
FIG. 8 is a transverse sectional view taken along line 8—8 of FIG. 5.

A second mandrel assembly is provided on the mandrel holder of FIG. 5 having outer expansible collet ring 55 and inner ring 56 with their mated frusto-conical surfaces in opposed engagement. Inner ring 56 is provided with a pair of internally threaded portions 57 registrable with keys 47B as shown in FIG. 8. Outer collet ring 55 abuts nut 58 which is threadably engaged with the holder 41. Rings 55 and 56 are prevented from relative rotational movement by key 59. Inner ring 56 has a radial slot 60 in its end which is engaged by spring-biased rod 61 to preclude relative rotational movement with respect to the mandrel holder 41 when the rod 61 is in place. The rod 61 may be manually disengaged from the slot 60 by movement of the lever 62 to the left.

When a tubular workpiece is placed over the expanding mandrel shown in FIG. 5, it is contacted along its interior by collet rings 48 and 55 which contain spring-biased ball plungers 63, which function in the same manner as ball plungers 38 described in connection with FIG. 1. When the shaft 43 is pulled to the left as viewed in FIG. 5, the head 44 applies leftward axial movement to keys 47A. In the first mandrel assembly, inner ring 49 being engaged with keys 47A is also moved to the left, wedging in collet ring 48 and expanding the latter against the interior of the workpiece. Before substantial wedging takes place, however, ring 48 is moved to the left as a result of this action, and through the nut 53 sleeve 51 is moved to the left imparting axial motion to keys 47B which are engaged therewith. Since keys 47B are also engaged with inner ring 56 of the second mandrel assembly, leftward wedging movement is imparted thereto. As collet ring 55 is restrained against axial movement by its contact with the nut 58 on holder 41, it is expanded against the interior of the workpiece.

The first mandrel assembly on the expanding mandrel shown in FIG. 5 may be axially adjusted or replaced by rotation of the entire assembly until the threaded portions 50 of ring 49 and the threaded portions 52 of ring 51 are over the lands 46. In this position, the first mandrel assembly may be shifted axially in either direction or may be removed from the right-hand end of mandrel portion 42 should it be desired to replace it with an assembly of different diameter. While the first mandrel assembly is removed, the second mandrel assembly may likewise be removed by rotation until threaded portions 57 of ring 56 are over the lands 46 removing the second assembly from engagement with the threads of mandrel holder portion 42 and of keys 47B. When the assemblies are replaced, rod 61 will prevent rotation and removal of the second mandrel assembly by its engagement in notch 60. The first mandrel assembly will also be prevented from rotation and removal by a pointed set screw (not shown) in sleeve 51 which will engage one of the longitudinal notches or grooves 70 in keys 47B in the same manner that screw 39 operates as shown in FIG. 3 in connection with the previously described embodiment.

In both embodiments of this invention, a set screw 71 may be provided in heads 14 and 44 to adjustably limit the inward motion thereof with respect to the mandrel holder portions 18 and 42. In both embodiments, the mandrel holders 11 and 41 are provided with four equally spaced bolt holes 72 in the enlarged ends thereof for attachment as to the head of a machine tool spindle.

The above-described invention provides an expansible mandrel which is well adapted to quick simple adjustment and disassembly for performance of machining operations on the ends of tubular workpieces such as electric motor shells or frames. Such workpieces, for different sizes of motors, are of different lengths and/or diameters and thus, in the interest of economy of manufacture, it is important to be able to quickly and easily make length adjustments in mandrels therefor and to replace mandrel assemblies for different diameters of workpieces. Moreover, in workpieces such as motor shells it is required to true the ends thereof so that they are coaxial and parallel to each other and perpendicular to the axis so that when the end bells are assembled to the shells, the rotor bearings will be coaxial. The present invention makes possible such accurate machining of the ends of motor shells. Conducive to such accurate gripping of the motor shells is the substantially equal division of the expanding force in the present invention so that the mandrels are expanded substantially simultaneously. Thus, when axial force is applied on one ring of one mandrel assembly expansion of said one mandrel assembly does not occur until the other ring is subjected to a reacting force from one ring of the other mandrel assembly. In this way substantially equal expanding forces act on both mandrel assemblies to expand them simultaneously to accurately center the motor shell for truing and finishing operations at the ends.

Other modes of applying the principle of the invention may be employed, change being made as regards the details described, provided the features stated in any of the following claims or the equivalent of such be employed.

We therefore, particularly point out and distinctly claim as our invention:

1. In an expansible mandrel for gripping tubular workpieces and the like, the combination of: a mandrel holder, a plurality of mandrel assemblies with expanders therefor mounted on said holder, axial force transmitting means on said holder engaging said assemblies, at least one mandrel assembly being axially adjustable with respect to another mandrel assembly and said force transmitting means, and actuating means on said holder engaging one assembly to expand it and through said force transmitting means to expand another assembly to grip a workpiece therearound.

2. An expansible mandrel according to claim 1 wherein said mandrel holder comprises a cylindrical surface having circumferential threads thereon, said surface having a plurality of threadless axial lands thereon of substantial width.

3. An expansible mandrel according to claim 2 wherein said force transmitting means comprises a plurality of axial keys slidably disposed in said cylindrical surface having surface threads thereon registrable with the threads of said cylindrical surface.

4. An expansible mandrel according to claim 1 wherein at least one of said mandrel assemblies comprises an inner ring and an outer ring having opposed mated frustoconical surfaces, said outer ring being expansible responsive to wedging movement of said inner ring, means for axially adjustably engaging said inner ring to said force transmitting means, and means in axially adjustable engagement with said outer ring to resist axial movement thereof during wedging movement of said inner ring.

5. An expansible mandrel according to claim 1 wherein said mandrel holder comprises an elongated cylindrical body and said actuating means comprises a shaft extending axially through said body having an enlarged head at one end, said shaft being connected to force means at the other end whereby said force means causes axial movement of said shaft drawing said head toward said body.

6. In an expansible mandrel for gripping tubular workpieces and the like, the combination of: a mandrel holder, a plurality of mandrel assemblies with expanders therefor mounted on said holder, axial force transmitting means on said holder, actuating means on said holder engaging a first mandrel assembly to expand it and force it against said force transmitting means, and a second mandrel assembly in axially adjustable engagement with said holder and said force transmitting means, whereby force by said first assembly against said force transmitting means expands said second assembly thereby gripping a workpiece around said expanded assemblies.

7. An expansible mandrel according to claim 6 wherein said mandrel holder comprises a cylindrical surface having circumferential threads thereon and a plurality of threadless axial lands thereon, and wherein said force transmitting means comprises a plurality of axial keys slidably disposed in said cylindrical surface, said keys having surface threads thereon registrable with the threads of said cylindrical surface.

8. An expansible mandrel according to claim 6 wherein each of said mandrel assemblies comprises an inner ring and an outer ring having opposed mated frusto-conical surfaces, said outer ring being expansible responsive to wedging movement of said inner ring, and wherein said second mandrel assembly contains a first means for axially adjustably engaging said inner ring to said force transmitting means, and a second means for axially adjustably engaging said outer ring to said mandrel holder to resist axial movement of said outer ring during wedging movement of said inner ring.

9. In an expansible mandrel for gripping tubular workpieces and the like, the combination of: a cylindrical mandrel holder having circumferential threads on its surface and a plurality of threadless axial lands thereon, said holder surface having a plurality of axial keys slidably disposed therein, said keys having surface threads thereon registrable with the threads of said holder surface; a plurality of mandrel assemblies mounted on said holder each comprising an inner ring and an outer ring having opposed mated frusto-conical surfaces, said outer ring being expansible responsive to wedging movement of said inner ring; actuating means on said holder engaging a first of said mandrel assemblies to expand it and force it against said keys producing axial movement thereof; and a second of said mandrel assemblies having a first sleeve engaged with its inner ring and having internally threaded portions circumferentially registrable with said keys, and a second sleeve in engagement with its outer ring and having internally threaded portions circumferentially registrable with the threads of said holder, whereby the said axial movement of said keys produced by said actuating means advances said first sleeve and its engaged inner ring in wedge movement into said outer ring which is held against axial movement by said second ring being engaged with said holder.

10. An expansible mandrel according to claim 9 wherein said first and second sleeves are interengaged for unified rotational movement but permitting relative axial movement.

11. An expansible mandrel according to claim 9 wherein said mandrel holder has three keys and three threadless axial lands, the width of each of said lands being wide enough to accommodate said internally threaded portions of said first and second sleeves, whereby the axial location of the entire second mandrel assembly may be adjusted by rotating said first and second sleeves until their internally threaded portions are over the said lands freeing them from engagement with the keys and holder and permitting axial adjustment thereof.

12. In an expansible mandrel assembly for gripping tubular workpieces and the like, the combination of: a mandrel holder, a plurality of mandrel assemblies with expanders therefor mounted on said holder, first and second force transmitting means on said holder, a first mandrel assembly in axially adjustable engagement with both said first and second force transmitting means; a second mandrel assembly in engagement with said second force transmitting means, and actuating means on said holder engaging said first force transmitting means, whereby axial movement of said actuating means expands said first mandrel assembly with consequent force upon said second force transmitting means to expand said second mandrel assembly.

13. An expansible mandrel according to claim 12 wherein said mandrel holder comprises a cylindrical surface having circumferential threads thereon, and a plurality of threadless axial lands thereon, and wherein said first and second force transmitting means comprise sets of axial keys slidably disposed in said cylindrical surface, said keys having surface threads thereon registrable with the threads of said cylindrical surface.

14. An expansible mandrel according to claim 12 wherein each of said mandrel assemblies comprises an inner ring and an outer ring having opposed mated frusto-conical surfaces, said outer ring being expansible responsive to wedging movement of said inner ring; and, wherein said first mandrel assembly contains means for axially adjustably engaging said inner ring to said first force transmitting means, and means for axially adjustably engaging said outer ring to said second force transmitting means; and wherein said second mandrel assembly contains means for engaging said inner ring to said second force transmitting means, and means for engaging said outer ring to said mandrel holder.

15. In an expansible mandrel for gripping tubular workpieces and the like, the combination of: a cylindrical mandrel holder having circumferential threads on its surface and a plurality of threadless axial lands thereon, said holder surface having two sets of axial keys slidably disposed therein, said keys having surface threads thereon registrable with the threads of said holder surface; a plurality of mandrel assemblies mounted on said holder each comprising an inner ring and an outer ring having opposed mated frusto-conical surfaces, said outer ring being expansible responsive to wedging movement of said inner ring; actuating means on said holder engaging a first set of said keys to produce axial movement thereof; a first of said mandrel assemblies having its inner ring formed with internally threaded portions circumferentially registrable and engageable with said first set of keys, and having a sleeve in engagement with its outer ring, said sleeve having internally threaded portions registrable and engageable with said second set of keys; and, a second of said mandrel assemblies having its inner ring formed with internally threaded portions circumferentially registrable and engageable with said second set of keys, and its outer ring engageable with said mandrel holder; whereby the axial movement of said first set of keys produced by said actuating means advances the inner ring of said first assembly in wedging movement against its outer ring producing axial movement of the latter which in turn axially advances the second set of keys with consequent wedging movement of the inner ring of said second assembly against its outer ring which is held against axial movement by engagement with said holder.

16. An expansible mandrel according to claim 15 wherein said inner ring and said sleeve of said first mandrel assembly are interengaged for unified rotational movement but permitting relative axial movement.

17. An expansible mandrel according to claim 15 wherein said mandrel holder has four keys and four axial threadless lands, the width of each land being wide enough to accommodate the said internally threaded portions, whereby the axial location of the entire first mandrel assembly may be adjusted by rotating said inner ring and sleeve until their internally threaded portions are over said lands freeing them for engagement with said keys and said holder permitting axial adjustment thereof.

References Cited in the file of this patent
UNITED STATES PATENTS

| | | |
|---|---|---|
| 2,734,749 | Benjamin | Feb. 14, 1956 |
| 2,734,750 | Nyland | Feb. 14, 1956 |
| 2,738,980 | Spahn | Mar. 20, 1956 |